United States Patent [19]

Kleinschmidt et al.

[11] 4,423,347

[45] Dec. 27, 1983

[54] POSITIONING ELEMENT WITH A PIEZO-CERAMIC BODY

[75] Inventors: Peter Kleinschmidt, Munich; Hans Meixner, Haar; Valentin Magori, Munich, all of Fed. Rep. of Germany

[73] Assignee: Siemens Aktiengesellschaft, Berlin & Munich, Fed. Rep. of Germany

[21] Appl. No.: 328,618

[22] Filed: Dec. 8, 1981

[30] Foreign Application Priority Data

Dec. 23, 1980 [DE] Fed. Rep. of Germany ....... 3048631

[51] Int. Cl.³ .............................................. H01V 7/00
[52] U.S. Cl. .................................... 310/331; 310/328; 310/326; 310/355
[58] Field of Search ............... 310/317, 323, 326, 327, 310/328, 330–332, 348, 354–356

[56] References Cited

U.S. PATENT DOCUMENTS

| | | | |
|---|---|---|---|
| 3,154,700 | 10/1964 | McNaney | 310/8.3 |
| 3,500,799 | 3/1970 | Benson | 123/32 |
| 3,748,503 | 7/1973 | Cobarg et al. | 310/331 |
| 3,760,203 | 9/1973 | Guntersdorfer | 310/8.1 |
| 3,835,338 | 9/1974 | Martin | 310/331 |
| 3,911,298 | 10/1975 | Borsdorf | 310/8.1 |
| 3,916,373 | 10/1975 | Schroder | 340/16 |
| 4,023,162 | 5/1977 | Murakami | 310/317 X |
| 4,188,645 | 2/1980 | Ragle et al. | 310/331 X |
| 4,228,440 | 10/1980 | Horike et al. | 310/317 X |

FOREIGN PATENT DOCUMENTS

| | | |
|---|---|---|
| 2551603 | 6/1977 | Fed. Rep. of Germany . |
| 1339688 | 9/1963 | France . |
| 143128 | 7/1980 | German Democratic Rep. . |
| 1475671 | 6/1977 | United Kingdom . |
| 2022901 | 12/1979 | United Kingdom . |

OTHER PUBLICATIONS

*Industrial Research*, vol. 4, 1978, "Serving the $76-Billion World-Wide R & D Industry".

Spanner et al., "Feinste Positionierungen mit Piezo-Antrieben", *Feinwerktechnik & Messtechnik*, (1979), pp. 181–183.

*Primary Examiner*—Peter S. Wong
*Attorney, Agent, or Firm*—Hill, Van Santen, Steadman & Simpson

[57] ABSTRACT

An electrically actuated positioning element system utilizes a positioning element formed of piezo-electrical bodies each formed of a plurality of lamellae having electrodes. The lamellae have a length substantially greater than their thickness and upon application of an electrical voltage with a field direction which promotes a polarization of the material of the lamellae, the body is shortened. The two bodies are connected to one another at one end by a cross arm and at the other end the one body end is active and free to move relative to the other body end such that a resultant relative motion occurring between the two body ends may be utilized. Preferably a connection is provided for absorbing a lateral thrust of the bodies. The two piezo-electrical bodies are each electrically connected to one another for reverse-phase operation such that one contracts while the other is in a lengthened condition and vice versa.

17 Claims, 10 Drawing Figures

POSITIONING ELEMENT WITH A PIEZO-CERAMIC BODY

BACKGROUND OF THE INVENTION

The present invention relates to a positioning element system in which a positioning element is provided formed of at least two piezo-electrical bodies each formed of a plurality of lamellae provided with electrodes. The lamellae extending in a motion direction of the positioning element are mechanically connected to one another with their principle surfaces parallel to the direction of motion so as to be immobile with respect to one another. Upon application of an electrical voltage with a field direction which promotes a polarization of the material of the lamellae, the body is shortened.

In the earlier German patent application No. P 30 40 563.1 (VPA 80P7188), incorporated herein by reference, a positioning or control element is disclosed with a piezo-electrical body as the transducer. This piezo-electrical body consists of a plurality of lamellae consisting of piezo-ceramic material, the principal surfaces of said lamellae being connected surface-wide to one another and immobile with respect to one another, whereby the length of the individual lamellae and thus of the entire body is at least 5 times as great as the thickness of the individual lamella. The lamellae all have the same thickness.

In a simple embodiment of such a body a plurality of such piezo-ceramic lamellae (each individually provided on its principal surface with a metallization as a electrode) are bonded to one another across their respective principal surfaces. This plurality of lamellae thus forms a mechanically stable bar or the like. The aforementioned metallizations have electrical terminals which lead to the outside. All lamellae are electrically connected in parallel to a controllable, electrical excitation voltage.

Depending on the height of the electrical excitation voltage, a piezo-electrically effected change of length of the body constructed of lamellae is produced. Because of the operational sign of the piezo-electrical coefficient $D_{31}$, a shortening of this laminated body is produced when an electrical voltage is applied whose field direction in the piezo-ceramic material of the individual lamella promotes the impressed polarization which exists there. One obtains an electrically effected elongation or lengthening of this laminated body when, after a preceding electrical charging (by voltage as specified above) of the lamellae of the body which form the electrical capacitances, one short-circuits all of said lamellae, i.e., allows these capacitances to discharge. The body which had been previously shortened due to electrical forces in its charged condition then quickly re-expands to its original length in its neutral condition.

For the sake of completeness, let it be noted that a positioning element consisting of a stack of tablets of piezo-ceramic material lying on top of one another in which the $D_{33}$ piezo effect is exploited has the opposite behavior. For example, this tablet stack experiences an elongation in the direction perpendicular to the principal surface of the tablets (i.e. in its stack height) when one again applies an electrical voltage to the individual tablets which promotes the polarization direction of the piezo-ceramic of the tablets.

A proposal has already been made to employ a tablet stack as described above in a positioning element combined with at least two laminated bodies consisting of piezo-ceramic as described above. The tablet stack and the laminated bodies are positioned adjacent to one another in such manner that the tablet stack lies between at least two laminated bodies. The tablet stack and the laminated bodies are connected to one another by means of a mechanically stable cross arm at their respective one adjacent end. When the respective opposite ends of at least the two outside laminated bodies are connected to the mass, for example to the housing or frame of a machine or the like, then the adjacent end of the tablet stack is the active end of such a positioning element. Accordingly, for example a valve or the like can be controllably actuated (with respect to the housing or frame of the machine). Because of the $D_{31}$ effect in the laminated bodies and of the $D_{33}$ effect in the tablet stack, a resultant dilation or expansion motion of said positioning element is produced given the parallel electrical connection of the laminated body and of the tablet stack for an applied electrical voltage with a direction of its field which promotes the impressed polarization.

Prior art relating to piezo-electrically actuated positioning elements include the publications German Letters Pat. No. P 17 98 339; Fienwektechnik und Messtechnik, Volume 87 (1979), pages 181–183; and Industrial Research Magazine, Volume 4 (1978), page 500, all incorporated herein by reference.

SUMMARY OF THE INVENTION

It is an object of the present invention to specify a piezo-electrical positioning element which exhibits the smallest possible cross-section for a prescribed actuation force and in which the fastening location and the function location are situated at the same end of the elongated positioning element. In particular, this positioning element should consist of individual piezo-ceramic parts which are identically structured insofar as possible, and if need be are also identical to one another. This positioning element should also be suitable for operation in an energy-saving manner, and with the smallest possible additional electronic expense.

This object is achieved for a positioning element wherein if two bodies are provided each formed of a plurality of lamellae, the bodies have approximately a same length and are disposed next to one another. The two bodies are connected to one another at one end by a cross arm and at the other end the one body end which is active is free to move relative to the other body end such that a resultant relative motion occurs between the two body ends which may be utilized. Preferably means for absorbing a lateral thrust of the bodies is provided. Also, the two piezo-electrical bodies are electrically connected for anti-phase operation relative to one another such that one contracts while the other lengthens and vice-versa. If three piezo-electrical bodies are provided, the two outer bodies are connected in parallel and operated in anti-phase operation with the inner body.

The present invention proceeds, among other things, by constructing the inventive positioning element in such manner that it has a relatively short (as seen relative to the setting stroke) overall length. The fastening location at the positioning element with which it is to be originally attached to a machine or the like and its active end (or, respectively, the functional location of the positioning element) with which the positioning element executes its positive and negative elongation motion with respect to the fastening location, lie together at the same side or at the same end of the positioning element. In particular, this active end of the positioning element can be a central tappet of the positioning element which is surrounded by a fastening thread. Given the inventive positioning element, the lines of influence of the forces in the at least two and preferably three participating piezo-electrical bodies can be in very close proximity in order to avoid sagging of the cross arm. By so doing, the disruptive inert mass of the cross arm can be reduced. The structure of an inventive positioning element makes it possible in a simple manner to provide advantageous damping or attenuation features at the positioning element. The inventive position element can also be dimensioned such that its inertial forces are distributed and a particularly high drive speed exists without having to significantly deviate for this structure from that dimension, which, in comparison thereto, guarantees optimum force exploitation.

The positioning element according to the invention is well suited to always re-employ within the positioning element the electrical charging energy required for the actuation of said positioning element, so that it is only for the mechanical, dialectric losses which necessarily occur as well as the transfer losses which must be compensated by means of electrical after-feed. In principal, the inventive positioning element contains two charge storage states, whereby the electrical charge is situated in one storage state in one positioning state and is situated in the other storage state in the other positioning state.

DESCRIPTION OF THE PREFERRED EMBODIMENTS

Figures 1, 2A:
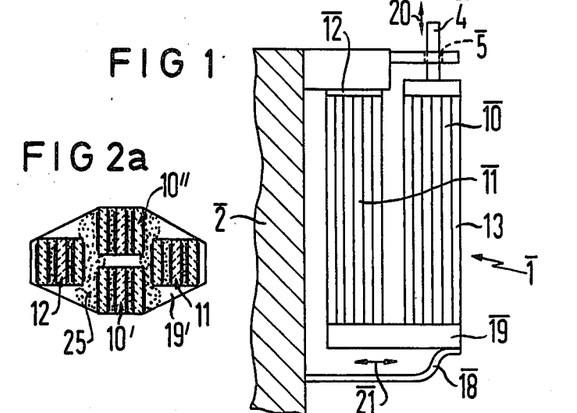
FIG. 1 shows a basic embodiment of a positioning element according to the invention.
FIG. 2 and FIG. 2a show alternative embodiments.

FIG. 1 shows a first embodiment of an inventive positioning element $\overline{1}$. It consists of two piezo-electrical bodies $\overline{10}$, $\overline{11}$, which are constructed of piezo-electrical lamellae 13. Details of such a structure have already been disclosed in the earlier German patent application No. P 30 40 563.1 incorporated herein by reference. The upper end of the piezo-electrical body $\overline{11}$ as shown in FIG. 1 is connected to a device $\overline{2}$ at which the inventive positioning element $\overline{1}$ is to be attached. This connection point is the securing location $\overline{12}$ of the positioning element $\overline{1}$. A cross arm is reference $\overline{19}$. The end of the piezo-electrical body $\overline{11}$ lying opposite the securing location $\overline{12}$ is connected to cross arm $\overline{19}$ and the lower (likewise in FIG. 1) end of the second piezo-electrical body $\overline{10}$ is secured next to it, so that the 2 piezo-electrical bodies $\overline{10}$ and $\overline{11}$ and the cross arm $\overline{19}$ together comprise a rigid, flexurally stiff part. The upper (in FIG. 1) end of the piezo-electrical body $\overline{10}$ is the function location of the positioning element $\overline{1}$ to which, for example, a tappet or projection element $\overline{4}$ is secured which exerts the stroke work of the inventive positioning element $\overline{1}$. The stroke of the positioning element $\overline{1}$ is indicated with the double arrow $\overline{20}$. A leaf spring which absorbs the dynamic effects occurring with the double arrow $\overline{21}$ and which is secured to the cross arm $\overline{19}$ and to the device 2 is referenced $\overline{18}$. Without the leaf spring $\overline{18}$, the inventive positioning element $\overline{1}$ or respectively cross arm $\overline{19}$ would execute excursive motions in the directions of the double arrow $\overline{21}$. The leaf spring $\overline{18}$ exerts no significant resistance to motion of the cross $\overline{19}$ in the direction perpendicular to the double arrow $\overline{21}$.

The inventive positioning element $\overline{1}$, with its two piezo-electrical bodies $\overline{10}$ and $\overline{11}$, functions according to the tandem principle, i.e., the two piezo-electrical bodies $\overline{10}$, $\overline{11}$ are electrically connected such that in one positioning condition the one piezo-electrical body (for example, $\overline{10}$) has maximum contraction and the other piezo-electrical body (for example, $\overline{11}$) has maximum dilation or elongation. In this case, the tappet or rod $\overline{4}$ guided in the bore $\overline{5}$ projects only minimally beyond the upper edge of guidance $\overline{5}$. In contrast thereto, in the other positioning condition, given maximum dilation or expansion of the piezo-electrical body $\overline{10}$ and maximum contraction of the other piezo-electrical body $\overline{11}$, the tappet $\overline{4}$ projects a maximum amount above the upper edge of the bore $\overline{5}$. Given piezo-electrical ceramic and a lamellae format as specified, the piezo-electrical body has a maximum contraction or smallest length in its charged state, and has its greatest longitudinal dimension or maximum expansion in its electrically discharged state.

Details concerning the electrical operation of a positioning element 1 in accordance with the invention proceed from the specification descriptions specifically relating thereto. These descriptions also relate to the other embodiments of the inventive positioning element described herein.

Figure 2:
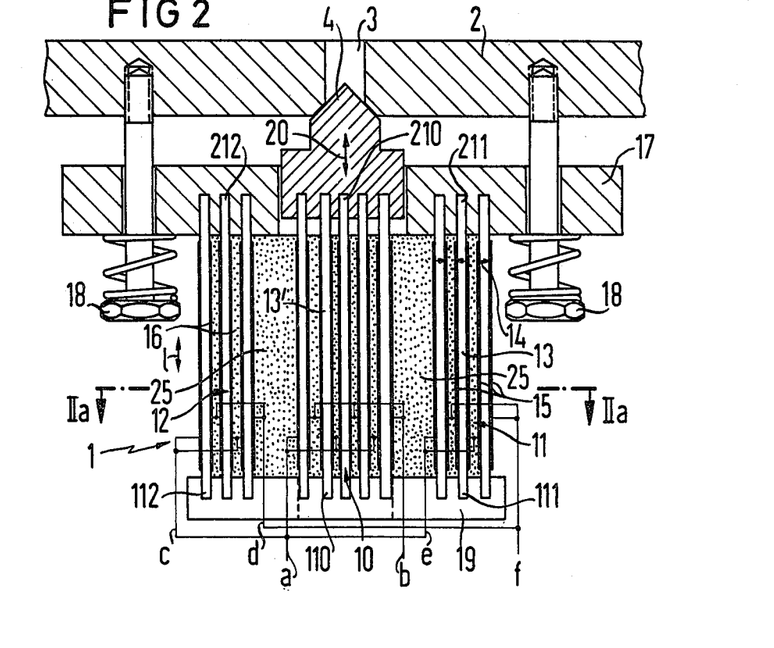

FIG. 2 shows a fundamental design of an inventive positioning element 1. The device to which the positioning element is to be attached is referenced 2. This for example is a portion of the housing wall of an injection valve. It has a valve opening 3 in which the valve cone 4 secured to the active end of the positioning element is in turn situated. 10, 11, and 12 indicate three bodies which are constructed of piezo-electrical lamellae 13, 13'. As has likewise been already disclosed in relation to the earlier German patent application No. P 30 40 563.1 incorporated herein, the individual piezo-electrical bodies 10, 11, 12 can be constructed according to different principles, for example with lamellae 13, 13' lying directly on top of one another or with lamellae 13, 13' between which inactive intermediate layers are situated. The individual lamellae 13, 13' of a respective body 10, 11, 12 are rigidly secured to one another with their principal surfaces (perpendicular to the plane of illustration in FIG. 1) in such manner that the lamellae 13, 13' cannot be moved with respect to one another. The impressed, electrical polarization of the individual lamellae 13, 13' is indicated with arrows 14. Electrode coatings, for example in the form of sputtered-on metallizations 15 on the ceramic surface, are applied to the outer principal surfaces of the lamellae 13, 13' between said lamellae of a respective body 10, 11, 12. The layers which effect the mechanical connection of respectively adjacent lamellae 13, 13' to one another and which are situated between the lamellae 13, 13', i.e. between the metalizations 15 lying opposite one another, are referenced 16. The layers 16 can preferably be adhesive. However, they can also be a solder layer of a solder-connection of adjacent metallization layers 15. Further-more, these individual spacing layers 16 can also be adhesive films such as, for example, the glass-fiber-reinforced epoxide material "Prepreg", a trademark of the Ciba Company.

FIG. 2 shows a fundamental design of an inventive positioning element. One body 10 is disposed beween at least two further bodies 11 and 12. The upper (in FIG. 1) ends 211 and 212 of the two outer bodies 11 and 12 are rigidly connected to a part 17, for example by means of adhesion, being screwed on, or the like, whereby part of 17 can also be a portion of the housing wall 2 or, preferably as illustrated be adjustably secured in aligned manner with screws 18 to the housing wall 2. The lower ends (in the illustration of FIG. 1) 110, 111, 112 of the bodies 10, 11, 12 are connected to one another by means of a flexurally stiff cross arm 19. An expansion or lengthening of bodies 11 and 12 due to the removal of an electrical voltage previously applied in the polarization-promoting direction leads to a downward (in FIG. 1) motion of the cross arm 19. Since there is a symmetrical format with the two bodies 11 and 12, no torque or pitching moment influences the cross arm 18. Upon expansion of bodies 11 and 12, the lower end 110 of the body 10 is pulled down. Given additional motion in the opposite direction, namely contraction of the body 10 due to application of a polarization-promoting voltage, the part 4 which is rigidly connected to the upper end 210 of the body 10 is moved down. The expansion of bodies 11 and 12 and the preferably simultaneously executed contraction of the body 10 additively leads to a doubled stroke motion of the part 4 as is indicated with that part of double arrow 20 which is directed downward. Contraction of the bodies 11 and 12 and preferably simultaneous dilation or lengthening of the body 10 leads to a corresponding motion of the part 4 directed toward the top which is indicated with the upper end of the double arrow 20.

The symmetrical format as illustrated and described leads to purely longitudinal motion of the part 4 and tilting or pivoting motions are avoided. A corresponding result is also achieved with 3, 4, or more outer bodies as are represented by bodies 11 and 12. Instead of the single body in the center as described above, another variation of the format can also have two or even more symmetrically disposed bodies lying between the bodies 11 and 12, both working in the same direction. Given such an embodiment, in FIG. 2a the one center 10 is so to speak divided into two bodies 10', 10" which can be at an interval from one another and which are in turn symmetrically disposed with respect to the outer bodies which respectively work in the opposite direction. Both bodies 10', 10" influence part 4 together. The cross arm 19' must then have a correspondingly large area in order to be able to accept all lower ends of all bodies and it must also be correspondingly flexurally stiff to a sufficient degree. Such an embodiment with two inside bodies can be advantageous insofar as these two inside bodies and two corresponding outer bodies 11 and 12 can have the identical structure per se and thus electrical capacitances of the same size exist for the inside bodies on the one hand and the outside bodies on the other hand.

In detail, the fundamental structure according to FIG. 2 can be designed in even further embodiments, depending upon the particular importance which is placed on one or more of the advantages offered by the invention. For example, priority can be placed on an optimum dynamic effect or, on an optimum power exploitation. In other cases, it can be quick response and quick execution of the expansion and contraction motion, for example for a quick opening and closing of a valve, which is particularly important. In the former case, it is recommended that the active cross-section of all piezo-ceramic lamellae 12 of the inside body 10 and the sum of the active cross-sections of all piezo-ceramic lamellae 13' of the two bodies 11 and 12 together be made of the same size.

What is meant by active cross-section of the piezo-ceramic lamellae 13, 13' is that cross-section surface which lies perpendicular to the plane of the drawing of FIG. 1 and perpendicular to the principle surface (covered with the metallization 15) of the lamellae 13, 13'. For example, the surface normal to the respective addressed cross-section surface is parallel to the longitudinal direction of these lamellae 13, 13' which is indicated with the double arrow 1. The metal coatings 15 (which, however, are already very thin) and the intermediate layers or respectively spacing layers or foils (not illustrated in the figure) which may potentially also be provided are piezo-electrically inactive. The respectively cited sum of cross-sections therefore only relates to the piezo-ceramic cross-sections of the lamellae 13, 13'. The term "active" cross-section is employed for this.

In the embodiment discussed above with active cross-sections of the same size for the inside body 10 and for the sum of the outside bodies 11 and 12, the generation of the force and the stroke and thus the work is equally divided between said inside body 10 and the totality of the outside bodies 11 and 12. Likewise, the electrical capacitances of the body 10 on the one hand, and of the totality of the bodies 11 and 12 on the other hand are of the same size. Thus, the two energy storages are likewise of the same size and, because of the opposing operation of these two parts of the positioning element, it is possible to have the electrical excitation energy necessary for the operation of the positioning element flow back and forth from one energy storage state to the other energy storage state. If this back and forth flow ensues across a suitably dimensioned inductance, and of course across a controllable switch lying in series thereto, then a practically loss-free back and forth transport of the complete energy necessary for the positioning operation can ensue. If one wishes to employ only uniformly designed bodies in this embodiment, the variation already described above can be provided for the inside body 10, that is instead of this single body 10 illustrated in FIG. 1, to employ two such bodies disposed next to one another and mechanically connected in parallel, as is provided for the bodies 11 and 12.

On the other hand, for a very quick motion of the part 4, for example, of the cone of a valve, it is recommended that of the two parts of the inventive positioning element which are mechanically connected in series—namely of the part formed on the one hand by the bodies 11 and 12 and the part formed on the other hand by the body 10 to design that part with lower mass which lies closer in the power flow to the part 4 to be moved. In the illustration of FIG. 2, this is the body 10. For example, a single body identical to the bodies 11 and 12 can be employed as body 10 which then has only half the inert mass of the bodies 11 and 12 together. Given a force of the same size, this lighter body 10 can then be accelerated faster—namely twice as fast—so that nearly twice as great a response speed is achieved for part 4. The only thing that must be sacrificed is that the inside body designed in this manner adds a correspondingly lower positioning force to the overall sum of the positioning forces of the entire inventive positioning element. If, given this embodiment, one employs three identical, laminated bodies for the three bodies illustrated in FIG. 2 in this manner, then the inside laminated body working opposite to the bodies 11 and 12 has an electrical capacitance which is only half as large. In this case, an appropriate electrical auxillary capacitor must be connected in parallel to the inside body of the positioning element for the purpose of a complete transfer of the electrical excitation energy as described above.

Two variations have been described above, namely with active cross-sections of the sum of the outer bodies 11, 12 on the one hand and of the one (or the sum of the divided) inside body 10 which are of the same size. The second, specifically described embodiment has a capacitance for the two outside bodies 11, 12 which is twice as great. In the first case, optimum positioning force and complete charge balancing for a transfer are given. In a second case, one obtains a positioning element which has higher work and response speed. Compromise solutions lie between these two instances when the ratio of the sum of the active cross-sections of the outer bodies to the active cross-section of the inside body lies between the valves 1 and 2.

Figure 3:
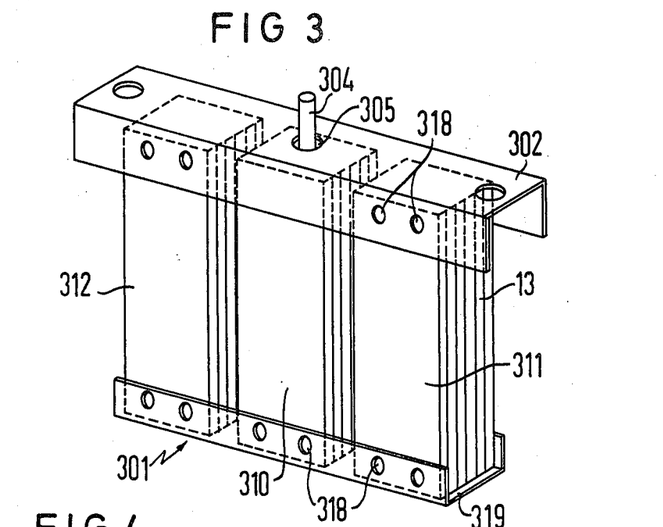
FIG. 3 shows a perspective view of a practical embodiment of the invention as a flat positioning element.

FIG. 3 shows a flat structural shape of an inventive positioning element 301 with the piezo-electrical bodies 310, 311 and 312 which correspond to the piezo-electrical bodies 10, 11, 12 of the positioning element 1. They again consist of piezo-electrical lamellae 13. At their upper (in FIG. 3) ends, the two outer piezo-electrical bodies 311 and 312 are originally connected to a U-profile 302 by means of screws 318 for example, the positioning element 301 to be secured with said U-profile to the device at or respectively in which said positioning element is meant to function. The center piezo-electrical body 310 is freely mobile at its upper end with respect to the U-profile 302, but is nonetheless guided by it. The working tappet 304 of the positioning element 301 projects through a bore 305 of the U-profile 302. 319 indicates the cross arm to which all three piezo-electrical bodies 310, 311 and 312 are secured with their respectively lower end. This fastening can likewise be effected with screws 318. The piezo-electrical bodies 310, 311 and 312 have corresponding through-bores for the acceptance of the screws 318. The U-shape of the cross arm 319 guarantees a high flexural stiffness. Further details of the positioning element 301 and its manner of operating correspond to the positioning element 1 from FIG. 2 or, respectively, proceed from the further specification to follow.

The piezo-electrical positioning element 1, 1 and 301 of FIGS. 1–3 have such a format in accordance with the invention that piezo-electrical bodies which contract and piezo-electrical bodies which expand at the same time are situated closely next to one another. The preferably narrow gap between the piezo-electrical bodies 10 and 11 or, respectively between the piezo-electrical bodies 10, 310 on the one hand, and the piezo-electrical bodies 11 and 12, or respectively 311, 312 on the other hand, is advantageously filled with a silicon grease or a silicon paste 25 (only illustrated in FIG. 2) for the purpose of damping (oscillatory) motions of the piezo-electrical bodies given a change from the one positioning state into the other positioning state. Frictional effects which have a damping influence but which nonetheless do not noticeably impede its function as a positioning element occur in this silicon mass 25 situated in the two gaps.

With the electrical terminals referenced e and f, FIG. 2 additionally shows an exemplary electrical circuit for the lamellae 13, 13'. Electrode coatings 15 which respectively lie opposite one another are electrically connected to one another. The respective opposite polarization direction of the piezo-electrical material in the direction of the thickness of the lamellae exists in mutually adjacent lamellae 13, 13'. As illustrated, inside electrode coatings connected to one another are connected to a respective outside electrode coating 15. The piezoelectric body 10 has the terminals a and b conducted to the outside. The two piezo-electrical bodies 11 and 12 have terminals e and f as well as c and d conducted toward the outside. In accordance with the interconnection of the piezo-electrical bodies 11 and 12 as a group A, the external connections d and f on the one hand, and the external connection c and e on the other hand are connected to one another. As a ground terminal, the terminals c and e are also connected to the terminal a of the piezo-electrical body 10 to be operated in anti-phase manner. The external terminal be of the piezo-electrical body 10 which forms the group B is electrically separated from the common external terminal f of the piezo-electrical bodies 11 and 12 of the group A.

In the case of the variation of FIG. 2 described above (on page 10, FIG. 2a) in which instead of only one body 10 a plurality of inside bodies are to be operated in the same phase, these form the group B which together like group A, likewise consist for example of two piezo-electrical bodies.

Figure 4:
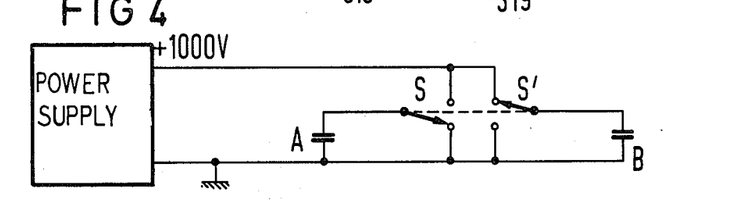
FIGS. 4 and 5 show circuits for operation of the invention.
Figure 5:
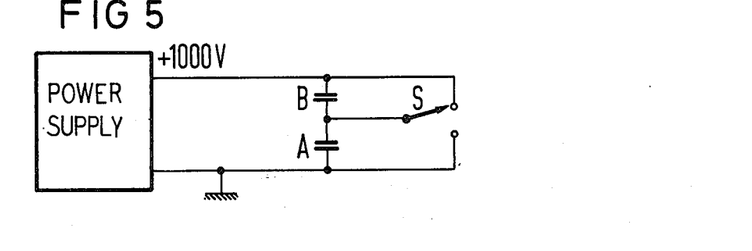

FIGS. 4 and 5 show respective connection diagrams for an operating circuit of an inventive positioning element. The capacitance referenced A in FIGS. 4 and 5 represents the piezo-electrical bodies of the one group and the capacitance B represents the piezo-electrical bodies of the other group whereby the piezo-electrical bodies of the one group are to be operated in push-pull with respect to those of the other group. For the embodiment according to FIG. 3 with outer piezo-electrical bodies, the capacitance A consists of the parallel connection of two capacitances of the piezo-electrical bodies 11 and 12. The capacitance of the single inside piezo-electrical body in FIG. 3 is the capacitance B in FIGS. 4 and 5. The illustrated change-over switches S and S' are actuated clockwise, whereby the charging and discharging of the capacitances A and B or, respectively, of the piezo-electrical bodies of an inventive positioning element ensues in push-pull manner. It is of particular advantage to electrically wire an inventive piezo-electrical positioning element which contains two piezo-electrical bodies to be operated in push-pull or respectively two groups A and B of piezo-electrical bodies to be operated in push-pull in such manner that the energy intermittently stored in the one piezo-electrical body in the one positioning state of said body is transferred upon transition or change-over into the other positioning condition to the one or to the plurality of other piezo-electrical bodies of the same positioning element. A back and forth charging of the electrical energies within the positioning element, i.e. a push-pull action of the two groups of piezo-electrical bodies of the positioning element, makes it possible that only the necessary losses of electrical energy must be respectively replaced. The large component of reactive energy, however, is not destroyed at every change of the positioning condition, as is the case given the circuits according to FIGS. 4 and 5.

Figure 6:
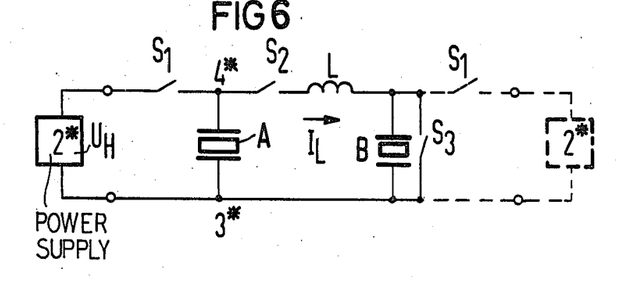
FIGS. 6 through 9 show circuits for a preferred electrical operation of the invention with electrical charge transfer of the individual piezo-electrical bodies of the positioning element among one another.

FIGS. 6, 7, 8 and 9 show the diagram and a specific embodiment of an electrical circuit as is particularly preferred for the operation of an inventive positioning element with piezo-electrical bodies to be operated in anti-phase. In these circuits, a respective inductance L, L'' exists in the circuit for the charge transfer from one piezo-electrical body to the other piezo-electrical body or, respectively, for the charge transfer from the one group of piezo-electrical bodies to the other group of piezo-electrical bodies. Further details can also be derived from the German application No. P 30 48 632.5 (80P8062) incorporated herein by reference. The circuit diagram of FIG. 6 shows the work principle of a charge transfer between the groups A and B of the piezo-electrical bodies of an inventive positioning element.

For the electrical charging of the piezo-electrical bodies (11 and 12 in FIG. 2) combined to form the group A, an electrical voltage $U_H$ for example, provided by an electrical source or power supply 2* with an internal resistance $R_i$.

Upon completion of the charging of group A, their piezo-electrical bodies have reached their second mechanical positioning state. The initial state without application of an electrical voltage is the first positioning state here. In the second positioning state, other than the electrical energy used for the mechanical work of the group A to be supplied from the source 2*, this has additionally had to supply the reactive energy contained in the electrical capacitance of group A, whereby the reactive energy is a multiple of the electrical energy converted into optimally derivable mechanical work.

After attainment of the second positioning state, the switch S1 is opened, whereby the second positioning state is essentially retained. Given a short-circuit of the terminals 3 and 4 of group A to one another, a charge equalization of the capacitance of their bodies, for example 11 and 12, ensues, whereby these bodies return into the first positioning state. The discharge current thereby flowing would, given a short-circuit, effect the destruction of the reactive energy contained in the capacitance. According to the further development, however, this should not be lost. To this end, given an open switch S1, the switch S2 is closed and the current flow across the inductance L and the capacitance of the group B leads to a drop of the charging state of group A which is nearly just as rapid and, simultaneously, leads to an electrical charging of group B. As mentioned above, the transfer time $t_u$ can amount to half the period duration 1/f or can be prescribed longer.

Dependent upon the inductance L and the capacitance values, the discharge operation of group A and the charging operation of the group B has a chronological state in which the electrical voltage at group A is practically equal to zero and the total reactive energy previously contained in group A is situated in group B. At this moment of highest charging voltage of group B to the value $U_c$, the switch S2 is opened and a feedback to the positioning element 1 is suppressed, so that the first uncharged positioning state of group A is again achieved.

As already specified above, the capacitance values of group A and of group B are to be selected as large as possible. The inductance L, the capacitance of group A, and the capacitance of the group B form a resonant circuit in which the voltage at group A decreases in accordance with $\frac{1}{2} U_B (1+\cos t)$ and the voltage at the group B increases in accord with $\frac{1}{2} U_B (1-\cos t)$. Given capacitances of A and B which are of equal size, the radian frequency amounts to $$\omega = 2\pi f = \frac{1}{\sqrt{L \cdot C/2}}$$

The point in time $t_u$ of the actuation of switch S2 is given by half the period duration $\tau$ of said radian frequency $\omega$.

The renewed transition of group A from its first positioning state into its second positioning state is achieved by means of renewed closing of switch S2, whereby the electrical energy stored in group B is again (except for line losses) fully transferred to the group A and the switch S1 is again opened after the time $\tau/2$. An energy loss which cannot be avoided can be compensated by means of a subsequent, brief closing of the switch S1. Specifically, the source 2 is allowed to after-feed sufficient charge into group A so that the original voltage $U_H$ is again at group A. In this state, group B is largely discharged.

Nonetheless, a residual charge which has remained in group B must be eliminated by means of closing the switch S3. Such a discharge would accumulate and, given alternating change of the positioning states of the positioning element, would diminish the degree of difference of the positioning states from one another (from time to time). The measure of eliminating the residual charge can also be carried out at group A. However, it suffices when this measure is carried out at group B or at group A, i.e. at every second positioning operation.

Figure 7:
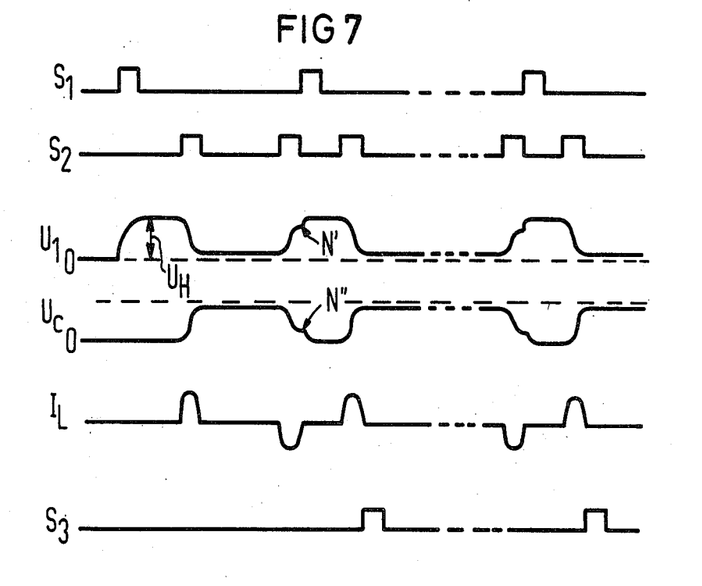

In six line graphs parallel and below one another, FIG. 7 shows the chronological sequence of individual functions and operations of the circuit according to FIG. 6. Time is entered on the abscissa. The first line graph shows the function of switch S1. The second line graph indicates the actuation of switch S2. The charge state of group A, i.e. the path of the voltage $U_S$ adjacent to group A, which derives therefrom is shown in line 3. Line 4 shows the corresponding voltage path at group B and line 5 shows the current I passing through the inductance L which is related thereto. The last line shows the chronological clock sequence of switch S3 which may be provided.

The left portion of the six lines in FIG. 7 shows the state of the first actuation of the positioning element. The state of the second and every further actuation after charging of the positioning element has ensued is shown by the central and by the right-hand portion of FIG. 7. In line 3, reference symbol N' notes the recharging point of the positioning element from the source 2, and N'' in line 4 points out the residual discharge (elimination of the residual charge) point of group B by means of closing the switch S3 (line 6 of FIG. 7).

In broken lines, FIG. 6 shows a variation in which the source 2* and the switch S1 of the left side of FIG. 6 are eliminated and, instead these elements are connected parallel to the group B. Accordingly their function remains unaltered. However, the group B is charged here in the first operating step, and group A—when the switch S2 remains open—remains in its first, initial positioning state. The charging of group A and its transition into the second positioning state then ensues in the next step when the switch S2 is closed. Accordingly, the first charging here also advantageously already occurs from group B and the operations sequence as is shown in the right-hand part in FIG. 7 has been explained above.

It should also be pointed out that group A and group B can be interchanged in the circuit of FIG. 6.

Figure 8:
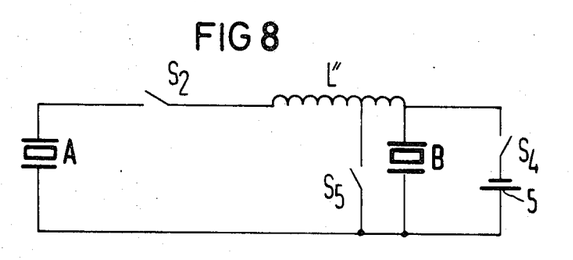

FIG. 8 shows a circuit for a vehicle in which a battery with, for example, 12 volts DC, is available as the energy source proceeding from which a piezo-electrical positioning element situated in said vehicle (particularly at the motor) is to be powered. Details already mentioned in conjunction with the description of the preceding figure have the same reference symbols in FIG. 8. The vehicle battery is referenced 5.

In the first operating phase of this embodiment, the switches S4 and S5 are closed. The inductance L" and group B are charged from the battery 5. In the following operating phase, the switch S5 is opened and the switch S2 is closed, whereby the switch S4 at first remains closed. Since the current flowing in the inductance L" has the tendency to flow further, the capacitance of group A is charged and the field of the inductance L" is thereby collapsed. As soon as the current into the capacitance of group A sinks to the value zero, and before the current begins to flow back out of group A, the switch S2 is again opened and group A remains charged, i.e. it has been brought from its previous, voltage-free, first operating state into its charged, second operating state. In case group A has not yet been fully charged in the initial phase by means of the one switching process step described above, this process step can be iteratively repeated until the desired charge is reached. The further operation of the circuit according to FIG. 8, i.e. the return of group A into its first, uncharged operating state, again ensues by means of closing the switch S2 with the function sequence as was described with respect to the preceding embodiments. The switch S5 is open during this phase.

A next re-charging of the capacitance of group A now predominately ensues from group B, for which purpose the switch S2 is closed until the zero passage of the charging current. A recharging for the compensation of the charge transfer loss occurs by means of closing the switches S4 and S5 as described above.

The circuit according to FIG. 8 can also be operated in a somewhat different manner, namely when switches S4, S5 as well are first closed in the first phase. In accordance with the differential quotient dI/dt, the starting current transferred in the inductance L" is driven into group A. As soon as this charging current of group A has reached the zero passage, the switches S2 and S5 are opened. The group A again remains in its second, charged operating state.

In the embodiment according to FIG. 8, thus the initial generation and re-supply of the required electrical energy is effected during operation from the provided battery.

The utilization of the residual charge remaining in group B after charge transfer to group A can be carried out given the embodiment according to FIG. 8 insofar as the electrical voltage of the residual charge exceeds the value of the nominal voltage of the battery 5. When the already charged group A is again returned into its first, uncharged operating state given a closed switch S2 and an open switch S4, the electrical energy previously stored in group A is transferred to group B. For a renewed charging of group A, the switch S2 is again closed and the electrical energy from group B flows back into group A. The residual charge remaining in group B can thereby be additionally transferred to group A since the switch S5 is closed. Accordingly the switch S4 still remains open, namely until the voltage at group B has dropped to the value of the voltage of the battery 5. It is only then that the switch S4 is closed and it is only then that the re-charging, i.e. the compensation of losses which occurred previously, ensues from the battery 5. The further phases then cycle as described.

Figure 9:
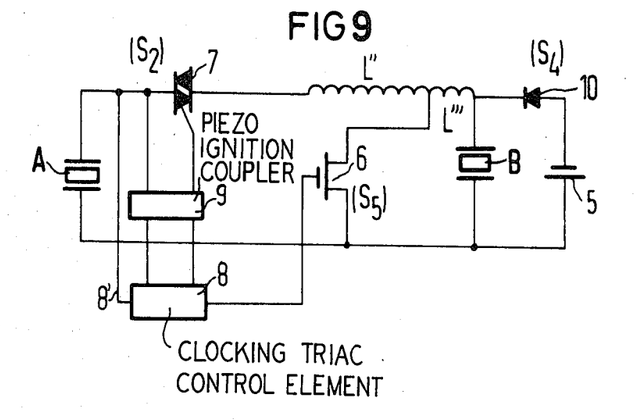

A practical embodiment of a circuit to be employed is shown in FIG. 9, and the details of the circuit insofar as they have been described above have reference symbols which coincide with those of FIGS. 6 and 8. The switch S4 of FIG. 8 is a diode in FIG. 5. In FIG. 9, the switch S5 is a voltage-stable transistor, for example a MOS power transistor 6.

The switch S2 in FIG. 9 is a triac or a reversed and parallel connection of two thyristors which is or are driven by a control element 8 in a clock sequence which is prescribed for the operation of the positioning element. An electrically separating ignition coupler, for example a piezo-ignition coupler as described in the German patent applications No. P 30 15 301.6 and No. P 30 35 503.4 incorporated by reference herein, is referenced 9. The line 8' serves for tapping and monitoring the charging voltage which has been achieved.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. An electrically actuated positioning element system, comprising: a positioning element formed of two piezo-electrical bodies each formed of a plurality of lamellae provided with electrodes, said lamellae extending in a motion direction of the positioning element between ends of said piezo-electrical bodies; the lamellae being mechanically connected to one another with their principle surfaces parallel to the direction of motion so as to be immobile with respect to one another; a length of the lamellae between the ends of the bodies being at least 5 times as great as a thickness of the individual lamellae and the lamellae all having the same thickness; said piezo-electrical bodies being designed such that upon application of an electrical voltage with a field direction which promotes a polarization of the material of the lamellae, the body to which the electrical voltage is applied is shortened; the two piezo-electrical bodies having approximately a same length and being disposed next to one another; the two bodies being connected to one another at their one ends by a cross arm, and at their other ends one of the bodies having its end active and free to move relative to the end of the other body such that a resultant relative motion occurring between the two body ends not connected by the cross arm may be utilized; means for absorbing a lateral thrust of the bodies; and the two piezo-electrical bodies being electrically connected to one another for reverse phase operation wherein one contracts while the other is in a lengthened condition and vice versa.

2. A positioning element system according to claim 1 wherein both bodies have a cross-section in a plane perpendicular to the direction of motion which is approximately the same size.

3. A positioning element system according to claim 1 wherein the piezo-electrical body with the active and free end has a cross-section in a plane perpendicular to the direction of motion which lies between 1 through 0.5 times that of the other piezo-electrical body.

4. A positioning element system according to claim 1 in which all piezo-electrical bodies of said positioning element are substantially identically designed in shape.

5. A positioning element system according to claim 1 wherein the positioning element is connected with its two piezo-electrical bodies in an electrical circuit with two piezo-electrical bodies forming a series connection together with a switch and an inductance whereby said inductance is of such size that a product of the inductance L and an overall capacitance value C of a series connection of the capacitances of the two piezo-electrical bodies to be operated in reverse-phase is at least approximately in a relationship $$\frac{1}{L \cdot C} = \omega 2$$

wherein $\omega$ is a mechanical basic resonant frequency of the positioning element.

6. A positioning element system comprising: a positioning element formed of at least three piezo-ceramic bodies connected to be operated by means of applying an electrical voltage with a field direction promoting polarization, the bodies being disposed and electrically connected in such manner that an inside one of the bodies in the positioning element executes longitudinal lengthening and contraction motion relative to bodies lying at an outside with respect thereto; the three bodies being of approximately a same length, being disposed next to one another, being connected to one another at their one ends, and at their other ends the end of the inside body being free to move relative to the end of each of the outside bodies such that a resultant relative motion is available for use; all piezo-ceramic bodies each being formed of lamellae whose length is disposed parallel to a direction of motion and whose principle surfaces lying parallel are mechanically connected to one another so as to be immobile with respect to one another; a length of the lamellae between the ends of the respective body being at least 5 times as great as a thickness of the individual lamella and the lamellae all having a same thickness; a first electrical terminal being provided for the inside body which is electrically separated from the outside bodies; and a second electrical terminal parallel connected to the outside bodies such that by use of the first and second terminals the inside body may be operated in reverse phase relative to the outside bodies such that if the inside body contracts the outside bodies are in a lengthened condition and vice-versa.

7. A positioning element system according to claim 6 wherein the three piezo-ceramic bodies are planar and whereby the principle surfaces of the lamellae coincide with the principle surfaces of the planar bodies; and the planar bodies being disposed next to one another with their principle surfaces opposite one another.

8. A positioning element system according to claim 6 wherein the three bodies are parallel to one another.

9. A positioning element system according to claim 6 wherein the three piezo-ceramic bodies are disposed close to one another in such manner that a gap volume therebetween is filled with a semi-elastic damping compound between bodies moving in reverse-phase.

10. A positioning element system according to claim 6 wherein a cross-section of the inside body in a plane perpendicular to the direction of motion is of at least approximately a same size as a sum of the corresponding cross-sections of all outside bodies.

11. A positioning element system according to claim 6 wherein a sum of cross-sections of the outside bodies lying perpendicular to the direction of motion amounts to 1 through 2 times a corresponding cross-section surface of the inside body, and a free end of the inside body is an active end of the positioning element.

12. A positioning element system according to claim 6 wherein the piezo-ceramic bodies are dimensioned in such manner that the overall electrical capacitance of the inside body is at least of approximately a same size as the overall electrical capacitance of all outside bodies connected in parallel.

13. A positioning element system according to claim 6 wherein an auxilliary electrical capacitor is connected in parallel to the inside body such that a combined capacitance of the capacitor and the inside body is substantially the same as a capacitance of all parallel connected outside bodies.

14. A positioning element system according to claim 6 wherein a capacitor is connected in parallel with one of the three piezo-ceramic bodies so that a capacitance of the inside body is substantially equal to the capacitance of all parallel connected outside bodies.

15. A positioning element according to claim 6 wherein the positioning element is connected to an electrical circuit in series with an inductance L and a switch S2 of the electrical circuit, whereby the inductance L has a size which is dimensioned in such manner that the product of the inductance value and a capacitance C is at least approximately the relationship $$\frac{1}{L \cdot C} = \omega 2$$

whereby $\omega$ is the mechanical basic resonant frequency of the positioning element and C is an overall capacitance value of all bodies connected in parallel.

16. An electrically actuated positioning element, comprising: first and second bodies each formed of a plurality of piezo-electrical lamellae, each lamella having parallel major faces covered by oppositely facing electrodes; a cross arm at one end of each of the first and second bodies rigidly connecting the two bodies together such that they lie parallel to one another in a lengthwise direction and in a direction of contraction of the bodies when voltage is applied; at the other end of each of the bodies the end of one of the bodies being secured and the end of the other body being free to move substantially only in the length-wise direction relative to the secured end so as to provide an active end whose lengthwise movement can be utilized; and electrical circuit means for permitting a voltage to be applied to the individual lamella of the two bodies such that when one of the bodies contracts the other body is in a lengthened condition.

17. A positioning element, comprising: at least one inner piezo-electrical body flanked by an outer piezo-electrical body at a side thereof; each piezo-electrical body being formed of a plurality of lamellae each provided with electrodes on parallel major surfaces; a length of each of the lamella being substantially greater than a width thereof; at one end of each of the piezo-electrical bodies a cross arm rigidly connecting the piezo-electrical bodies to one another; at the other end of the piezo-electrical bodies the outer body being secured relative to an end of the inner body which is moveable with respect thereto, such movement being available for use; electrical circuit means for applying a voltage to at least one of the piezo-electrical bodies such that when the inner body contracts the outer body is in a lengthened condition and vice versa, and when the voltage is applied to one of said bodies, said one body contracts and has substantially no lateral movement.

* * * * *